(12) United States Patent
Dai (10) Patent No.: US 11,409,623 B2
(45) Date of Patent: Aug. 9, 2022

(54) INTEGRATED CIRCUIT (IC) POWER-UP TESTING METHOD AND DEVICE, AND ELECTRONIC EQUIPMENT

(71) Applicant: Changxin Memory Technologies, Inc., Anhui (CN)

(72) Inventor: Yangyang Dai, Hefei (CN)

(73) Assignee: Changxin Memory Technologies, Inc., Hefei (CN)

( * ) Notice: Subject to any disclaimer, the term of this patent is extended or adjusted under 35 U.S.C. 154(b) by 0 days.

(21) Appl. No.: 17/221,657

(22) Filed: Apr. 2, 2021

(65) Prior Publication Data

US 2021/0224172 A1 Jul. 22, 2021

Related U.S. Application Data

(63) Continuation of application No. PCT/CN2019/118466, filed on Nov. 14, 2019.

(30) Foreign Application Priority Data

Nov. 22, 2018 (CN) .......................... 201811396944.X (51) Int. Cl.
*G06F 11/30* (2006.01)
*G06F 11/22* (2006.01)

(52) U.S. Cl.
CPC ................ *G06F 11/2284* (2013.01)

(58) Field of Classification Search
CPC .. G06F 11/2284; G06F 11/36; G06F 11/3684; G06F 11/3688
See application file for complete search history.

(56) References Cited

U.S. PATENT DOCUMENTS 5,815,402 A 9/1998 Taylor et al.
8,829,898 B1 * 9/2014 Solt .................... G01R 31/2879
324/240

(Continued)

FOREIGN PATENT DOCUMENTS

CN 102540060 A 7/2012
CN 102622471 A 8/2012
(Continued)

OTHER PUBLICATIONS

PCT International Search Report and the Written Opinion dated Feb. 10, 2020, issued in related International Application No. PCT/CN2019/118466 (6 pages).

(Continued)

*Primary Examiner* — Matthew M Kim
*Assistant Examiner* — Kyle Emanuele
(74) *Attorney, Agent, or Firm* — Sheppard Mullin Richter & Hampton LLP (57) ABSTRACT

An integrated circuit (IC) power-up testing method, an IC power-up testing device, a storage medium and an electronic equipment are disclosed. The IC power-up testing method includes: obtaining power-up testing parameters for an IC; obtaining a plurality of power-up testing waveforms; generating a plurality of power-up test instances by conducting parameter assignments for the power-up testing waveforms based on the power-up testing parameters; and performing power-up tests on the IC using the plurality of power-up test instances. The method allows simulating various IC power-up scenarios through a plurality of power-up test instances.

17 Claims, 7 Drawing Sheets

(56) References Cited

U.S. PATENT DOCUMENTS

| | | | |
|---|---|---|---|
| 10,606,723 B2 | 3/2020 | Bongale et al. | |
| 2014/0354333 A1* | 12/2014 | Phan | G06F 1/32 327/109 |
| 2018/0080979 A1* | 3/2018 | Brown | G01R 1/07378 |

FOREIGN PATENT DOCUMENTS

| | | | |
|---|---|---|---|
| CN | 104035051 A | | 9/2014 |
| CN | 104268078 A | | 1/2015 |
| CN | 104535912 A | * | 4/2015 |
| CN | 104535912 A | | 4/2015 |
| CN | 104808654 A | | 7/2015 |
| CN | 106597062 A | | 4/2017 |
| CN | 106936495 A | | 7/2017 |
| CN | 108351825 A | | 7/2018 |
| CN | 111239636 A | * | 6/2020 |
| EP | 2184614 A2 | | 5/2010 |

OTHER PUBLICATIONS

First Search dated Jan. 13, 2021, issued in related Chinese Application No. 201811396944.X (2 pages).

First Office Action dated Jan. 20, 2021, issued in related Chinese Application No. 201811396944.X, with English machine translation (14 pages).

PCT International Preliminary Report on Patentability dated Jun. 3, 2021, issued in related International Application No. PCT/CN2019/118466 (5 pages).

Supplementary Search dated May 26, 2021, issued in related Chinese Application No. 201811396944.X (1 page).

Second Office Action dated Jun. 2, 2021, issued in related Chinese Application No. 201811396944.X, with English machine translation (14 pages).

* cited by examiner

Noise　　　　Initial　　　　Superimposed
　　　　　　　　　　　　　　(with noise)

INTEGRATED CIRCUIT (IC) POWER-UP TESTING METHOD AND DEVICE, AND ELECTRONIC EQUIPMENT

CROSS-REFERENCE TO RELATED APPLICATIONS

This application is a continuation application of International Patent Application No. PCT/CN2019/118466, filed on Nov. 14, 2019, which is based on and claims priority of the Chinese Patent Application No. 201811396944.X, filed on Nov. 22, 2018. The above-referenced applications are incorporated herein by reference in its entirety.

TECHNICAL FIELD

The present disclosure relates generally to the technical field of integrated circuits (ICs) and more specifically, but not by way of limitation, to an IC power-up testing method, an IC power-up testing device, a memory medium and an electronic equipment.

BACKGROUND

In an IC fabrication process, a plurality of tests needs to be conducted in different stages of the fabrication so that potential defects in a product can be detected before the product is released to the market. As a result, the yield of the IC products can be improved. Existing IC test devices, however, are designed to test only some specific functionalities, and the power-up process of the IC is performed by a separated power-up device different from the test device used in the subsequent functional tests. An issue in the power-up process may affect the following functional tests. Due to different test environments, it is difficult to determine whether there exists any problem in the power-up process based on the test result of the subsequent functional tests. Therefore, there is an urgent need to integrate the power-up process and subsequent functional tests of an IC.

It is to be noted that the information disclosed in this Background section is only for facilitating the understanding of the background of the disclosure and therefore may contain information that does not form the prior art known to a person of ordinary skill in the art.

SUMMARY

In view of the limitation of existing technologies described above, the present disclosure provides a power-up testing method applicable to an integrated circuit (IC), an IC power-up testing device, a computer-readable memory medium and an electronic equipment that address at least some of the above-discussed limitations and deficiencies in the related art, including the difficulty in testing and analyzing an issue raised in the power-up process of an IC using existing test devices.

One aspect of the present disclosure is directed to a power-up testing method, applicable to an integrated circuit (IC). The method may include: obtaining power-up testing parameters for the IC; obtaining a plurality of power-up testing waveforms; generating a plurality of power-up test instances by conducting parameter assignments for the power-up testing waveforms based on the power-up testing parameters; and performing power-up tests on the IC using the plurality of power-up test instances.

In some embodiments of the present disclosure, obtaining power-up testing parameters for the IC may include: obtaining a target voltage and power-up duration for the IC.

In some embodiments of the present disclosure, obtaining power-up testing parameters for the IC may further include: obtaining a number for voltage steps for the IC.

In some embodiments of the present disclosure, obtaining a number of voltage steps for the IC may include: obtaining a maximum number and a minimum number of voltage steps; and choosing a number between the maximum number and the minimum numbers as the number for voltage steps.

In some embodiments of the present disclosure, generating a plurality of power-up test instances by conducting parameter assignments for the power-up testing waveforms based on the power-up testing parameters may include: determining a step height of the voltage steps based on the target voltage and the number of voltage steps; determining a step width of the voltage steps based on the power-up duration and the number of voltage steps; and generating the plurality of power-up test instances by conducting parameter assignments for the power-up testing waveforms based on the step height and the step width.

In some embodiments of the present disclosure, obtaining a plurality of power-up testing waveforms may include: obtaining a plurality of initial waveforms and a plurality of noise waveforms; and obtaining the plurality of power-up testing waveforms by superimposing the plurality of initial waveforms and the plurality of noise waveforms.

In some embodiments of the present disclosure, the plurality of initial waveforms and the plurality of noise waveforms may be step voltage waveforms.

In some embodiments of the present disclosure, each of the plurality of initial waveforms may be an ascending step waveform, and each of the plurality of noise waveforms may be a randomly distributed step waveform.

In some embodiments of the present disclosure, obtaining a plurality of initial waveforms and a plurality of noise waveforms may include: choosing the plurality of initial waveforms and the plurality of noise waveforms from a predefined test waveform library.

In some embodiments of the present disclosure, performing power-up tests on the IC using the plurality of power-up test instances may include: arranging the power-up test instances into a test sequence; and performing power-up tests on the IC by successively using each of the power-up test instances in the test sequence. If a test result of using one of the power-up test instances in the test sequence is a failure, the power-up tests on the IC continue by using a next one of the power-up test instances in the test sequence.

In some embodiments of the present disclosure, performing power-up tests on the IC using the plurality of power-up test instances may include: arranging the power-up test instances into a test sequence; and performing power-up tests on the IC by successively using each of the power-up test instances in the test sequence. If a test result of using one of the power-up test instances in the test sequence is a failure, the power-up tests on the IC is terminated.

Another aspect of the present disclosure is directed to an IC power-up testing device. The device may include: an acquisition circuit, an assignment circuit, and a testing circuit. The acquisition circuit may be configured to obtain power-up testing parameters for an IC, and a plurality of power-up testing waveforms. The assignment circuit may be configured to generate a plurality of power-up test instances by conducting parameter assignments for the power-up testing waveforms based on the power-up testing parameters. The testing circuit may be configured to perform power-up tests on the IC using the plurality of power-up test instances.

Another aspect of the present disclosure is directed to an electronic equipment. The electronic equipment may include: a processor and a memory. The memory may be configured to store instructions executable by the processor. The processor may be configured to, by executing the instructions, perform a power-up testing method applicable to an IC. The method may include: obtaining power-up testing parameters for the IC; obtaining a plurality of power-up testing waveforms; generating a plurality of power-up test instances by conducting parameter assignments for the power-up testing waveforms based on the power-up testing parameters; and performing power-up tests on the IC using the plurality of power-up test instances.

In some embodiments of the present disclosure, when obtaining power-up testing parameters for the IC, the processor may be further configured to obtain a target voltage and a power-up duration for the IC.

In some embodiments of the present disclosure, when obtaining power-up testing parameters for the IC, the processor may be further configured to obtain a number of voltage steps for the IC.

In some embodiments of the present disclosure, to obtain a number of voltage steps for the IC, the process may be further configured to obtain a maximum number and a minimum number of voltage steps; and choose a number between the maximum number and the minimum number as the number of voltage steps.

In some embodiments of the present disclosure, when generating a plurality of power-up test instances, the processor may be further configured to determine a step height of the voltage steps based on the target voltage and the number of voltage steps; determine a step width of the voltage steps based on the power-up duration and the number of voltage steps; and generate the plurality of power-up test instances by conducting parameter assignments for the power-up testing waveforms based on the step height and the step width.

In some embodiments of the present disclosure, when obtaining power-up testing parameters for the IC, the processor may be further configured to obtain a plurality of initial waveforms and a plurality of noise waveforms; and obtain the plurality of power-up testing waveforms by superimposing the plurality of initial waveforms with the plurality of noise waveforms.

In some embodiments of the present disclosure, the plurality of initial waveforms and the plurality of noise waveforms may be step voltage waveforms.

In some embodiments of the present disclosure, each of the plurality of initial waveforms may be an ascending step waveform, and each of the plurality of noise waveforms may be a randomly distributed step waveform.

According to the embodiments of the present disclosure, a plurality of power-up test instances may be generated based on various power-up testing waveforms and power-up testing parameters, which may be used to simulate various IC power-up scenarios. In addition, the various power-up test instances can be implemented as program codes executable by a functional test device. Thus, both the power-up test and subsequent functional tests can be performed and controlled by one single functional test device, which facilitates the interpretation of the test results.

The above general description and the following detailed description are intended to be illustrative and do not limit the present disclosure.

BRIEF DESCRIPTION OF THE DRAWINGS

The accompanying drawings, which are incorporated in and constitute a part of the description, illustrate embodiments consistent with the present disclosure and, together with the description, serve to explain the disclosed principles. It is apparent that these drawings show only some embodiments of the disclosure and those of ordinary skill in the art may obtain drawings of other embodiments from them without exerting any creative work.

DETAIL DESCRIPTION OF THE EMBODIMENTS

Exemplary embodiments will now be described more fully with reference to the accompanying drawings. However, these exemplary embodiments can be implemented in many forms and should not be construed as being limited to those set forth herein. Rather, these embodiments are presented to provide a full and thorough understanding of the present disclosure and to fully convey the concepts of the exemplary embodiments to those skilled in the art. In addition, the described features, structures, and characteristics may be combined in any suitable manner in one or more embodiments.

Further, the annexed drawings are merely illustrative of the present disclosure and not necessarily drawn to scale. Throughout the figures, like reference numbers indicate identical or similar elements, so any duplicate description of them will be omitted. The represented blocks in the figures are purely functional entities, which do not necessarily correspond to physically separate entities. These functional entities may be implemented as software, in one or more hard circuits or ICs, or in different networks and/or processor devices and/or microcontroller devices.

The present disclosure first provides a power-up testing method applicable to an integrated circuit (IC). The method may be used to test a power-up process of an IC, so as to assess its power-up performance, thereby preventing any subsequent functional test from being adversely affected by any fault occurring during the power-up test process. According to some embodiments, the IC may be, without limitation, any type of memory, such as a dynamic random-access memory (DRAM) or static random-access memory (SRAM), or any other functional IC chips.

Figure 1:
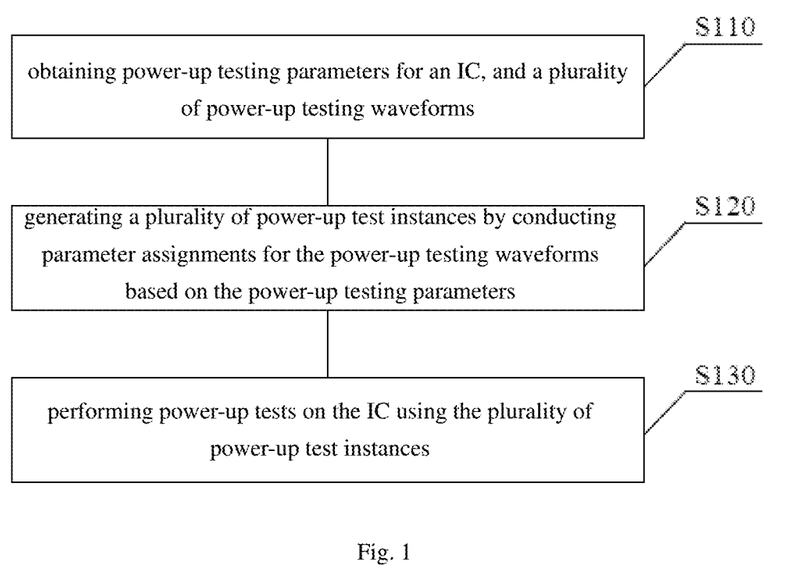
FIG. 1 shows a flowchart illustrating a power-up testing method in accordance with one embodiment of the present disclosure.

Referring to FIG. 1, the power-up testing method may include the following steps S110 to S130.

In step S110, power-up testing parameters for an IC, and a plurality of power-up testing waveforms may be obtained.

In this step, the power-up testing parameters for the IC may be obtained according to test requirements. For example, without limitation, the power-up testing parameters may be either set by a tester in real time according to both the test requirements and the characteristics of the IC or retrieved from a predefined parameter database. In this step, the power-up testing waveforms may also be obtained. Similar to the power-up testing parameters, the power-up testing waveforms may be, without limitation, either set by a tester in real time according to both the test requirements and the characteristics of the IC or retrieved from a predefined power-up testing waveform library.

Figure 2:
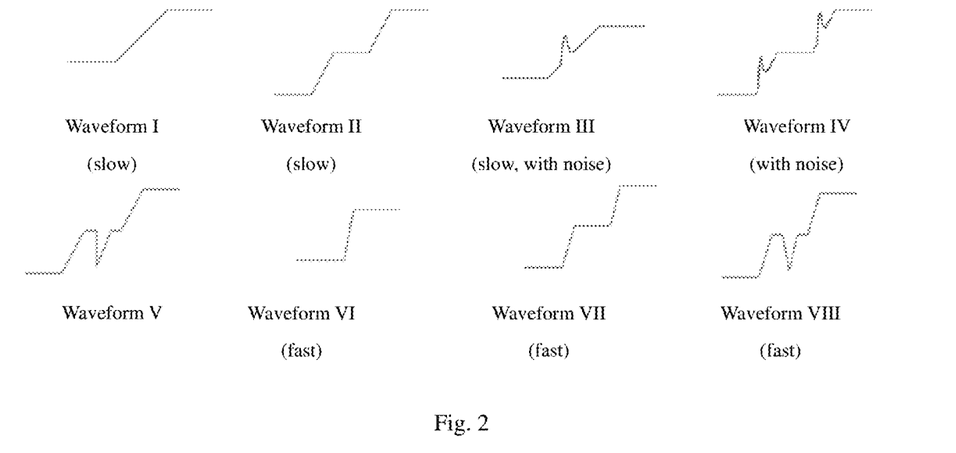
FIG. 2 shows schematic diagrams of power-up testing waveforms in accordance with one embodiment of the present disclosure.

FIG. 2 shows schematic diagrams of power-up testing waveforms in accordance with one embodiment of the present disclosure. Referring to FIG. 2, Waveforms I, II and III can be categorized as slow waveforms since each of them has a middle section with a small slope indicating that the power-up speed is low. Waveforms VI, VII and VIII can be categorized as fast waveforms since each of them has a middle section with a large slope indicating that the power-up speed is high. In addition, both Waveform III and IV exhibit irregular protrusions in their middle sections, indicating noises in these sections.

In step S120, a plurality of power-up test instances may be generated by conducting parameter assignments for the power-up testing waveforms based on the power-up testing parameters.

The power-up testing waveforms obtained in step S110 may be waveforms merely showing voltage changes. In this step, parameter assignments may be done for the power-up testing waveforms based on the power-up testing parameters, so that a plurality of power-up test instances may be generated. For example, parameter assignments may be done on parameters of power-up testing waveforms including an initial voltage, a final voltage, a voltage change based on the power-up testing parameters. Each of the power-up test instances generated in this step may be implemented as a specific program code that can be retrieved and executed by a functional test device.

In step S130, power-up tests on the IC may be performed using the plurality of power-up test instances.

In this step, the power-up test instances obtained from step S120 may be used to perform power-up tests on the IC. In practice, all the power-up test instances may be used successively to perform power-up tests on the IC, so as to simulate various power-up scenarios and perform power-up tests under these power-up scenarios. Alternatively, in order to speed up the overall power-up testing process, one or more of the power-up test instances obtained from step S120 may be selected to test the IC.

According to the present exemplary embodiment, a plurality of power-up test instances may be generated based on various power-up testing waveforms and power-up testing parameters, which may be used to simulate various IC power-up scenarios. In addition, the various power-up test instances can be implemented as program codes executable by a functional test device. Thus, both the power-up test and subsequent functional tests can be performed and controlled by one single functional test device, which facilitates the interpretation of the test results.

Figure 3:
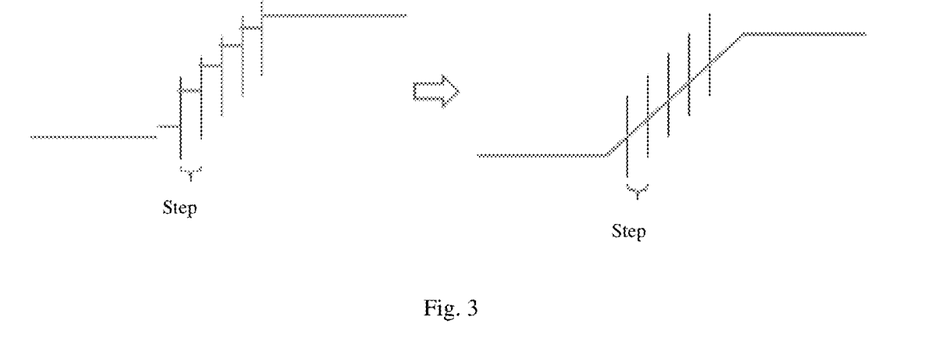
FIG. 3 shows schematic diagrams of a fitting process for a step voltage of a power-up testing waveform in accordance with one embodiment of the present disclosure.

In some embodiments, in step S110, obtaining the power-up testing parameters for the IC may include obtaining a target voltage and a power-up duration for the IC. Additionally, it may also include obtaining a number of voltage steps for the IC. Here, the target voltage may refer to a final voltage that the IC will reach in a power-up test. For example, if the target voltage is 1.2 V, the voltage will increase from 0 V to 1.2 V in a power-up process. The power-up duration may refer to a period of time a power-up test last for. For example, the power-up duration may be 10 ms. As shown in FIG. 3, in some embodiments, the power-up testing waveform may be obtained by fitting the step voltages. In the case that the target voltage and the power-up duration remain unchanged, the more the voltage steps used in a fitting, the better the fitted power-up testing waveform will be.

In some embodiments, obtaining a number of voltage steps for the IC may include: firstly, obtaining a maximum number and a minimum number of voltage steps; and then choosing a number between the maximum number and the minimum numbers as the number of voltage steps. For example, in some embodiments, the maximum number may be set to 50, and the minimum number may be set to 10. In this case, any number between 10 and 50 may be chosen as the number of voltage steps. By choosing different numbers of voltage steps, the power-up test instances may be diversified, resulting in improved power-up testing performance.

Figure 4:
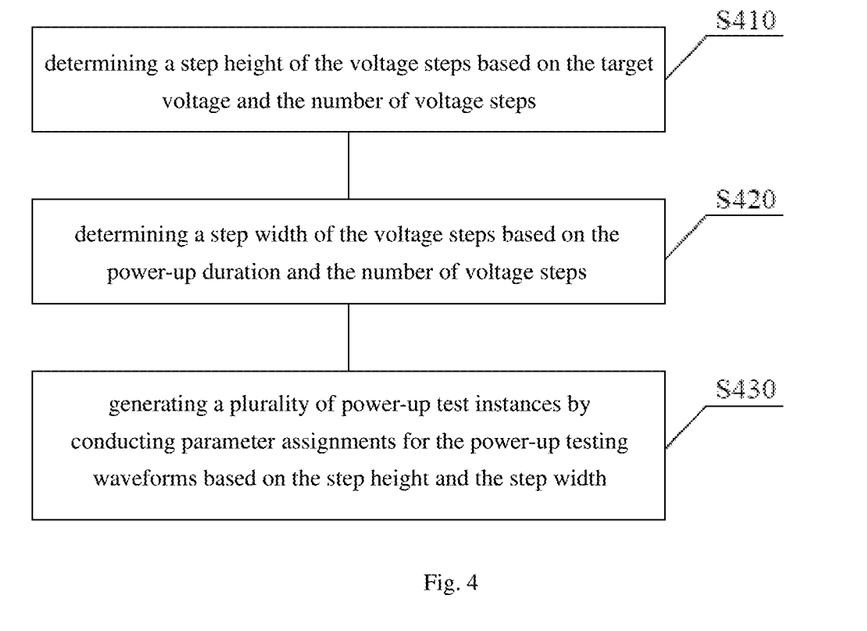
FIG. 4 shows a flowchart illustrating some steps of a power-up testing method in accordance with one embodiment of the present disclosure.

FIG. 4 shows a flowchart illustrating some steps of a power-up testing method in accordance with one embodiment of the present disclosure. Referring to FIG. 4, on the basis of the foregoing exemplary embodiments, in step S120, generating a plurality of power-up test instances by conducting parameter assignments for the power-up testing waveforms based on the power-up testing parameters may further include the following steps S410 to S430.

In step S410, a step height of the voltage steps may be determined based on the target voltage and the number for voltage steps.

The step height of the voltage steps may refer to a voltage change in a single voltage step during the power-up process. For example, assuming that the target voltage is set to 1.2 V and the number of voltage steps is set to 4, the voltage change in a single voltage step can be determined to be 0.3 V.

In step S420, a step width of the voltage steps may be determined based on the power-up duration and the number for voltage steps.

The step width of the voltage steps may refer to a period of time that each of the voltage steps lasts during the power-up process. For example, assuming that the power-up duration is set to 10 ms and the number of voltage steps is set to 4, the step width of the voltage steps can be determined to be 2.5 ms.

In step S430, a plurality of power-up test instances may be generated by conducting parameter assignments for the power-up testing waveforms based on the step height and the step width.

In this step, based on the step height determined from step S410 and the step width determined from step S420, parameter assignment may be conducted for the power-up testing waveforms to generate the power-up test instances.

In one exemplary embodiment of the present disclosure, in step S110, obtaining a plurality of power-up testing waveforms may include: firstly, obtaining a plurality of initial waveforms and a plurality of noise waveforms; and then obtaining the plurality of power-up testing waveforms by superimposing the plurality of initial waveforms with the plurality of noise waveforms. The initial waveforms and noise waveforms may be step voltage waveforms. According to this exemplary embodiment, a test waveform library containing various waveforms, including the initial waveforms and noise waveforms, may be constructed in advance, from which the initial waveforms and the noise waveforms can be retrieved as needed.

Figure 5:
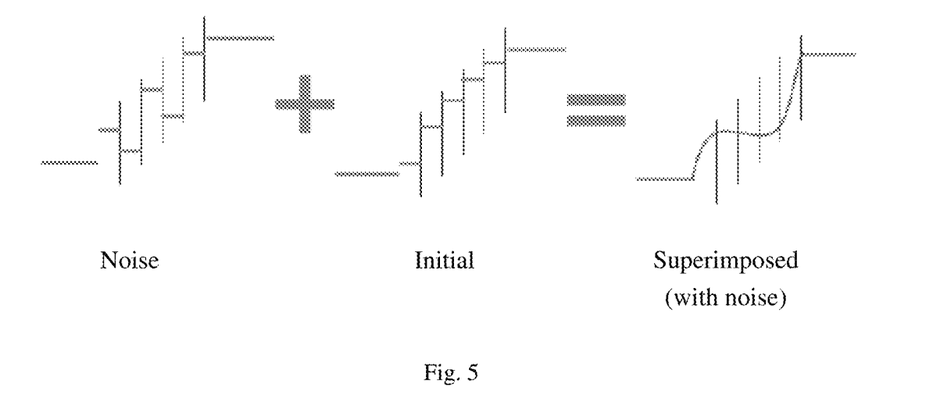
FIG. 5 shows schematic diagrams of a superimposition of power-up testing waveforms in accordance with one embodiment of the present disclosure.

FIG. 5 shows schematic diagrams of a superimposition of power-up testing waveforms in accordance with one embodiment of the present disclosure. Referring to FIG. 5, the initial waveform shows ascending steps while the noise waveform shows randomly distributed steps, and a power-up testing waveform with noise can be formed by superimposing the initial waveform and the noise waveform.

Figure 6:
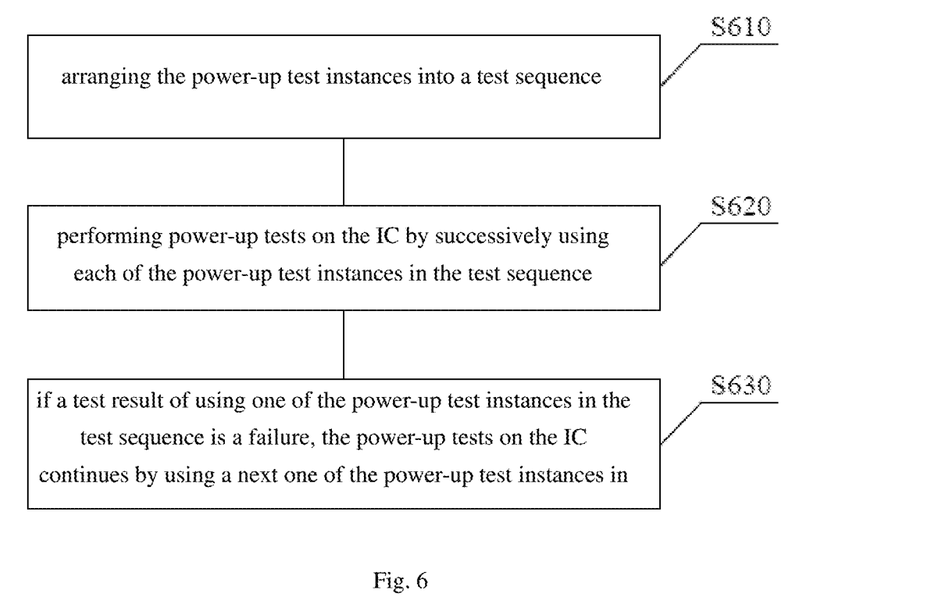
FIG. 6 shows a flowchart illustrating some steps of a power-up testing method in accordance with one embodiment of the present disclosure.

FIG. 6 shows a flowchart illustrating some steps of a power-up testing method in accordance with one embodiment of the present disclosure. Referring to FIG. 6, in some embodiments of the present disclosure, in step S130, performing power-up tests on the IC using the power-up test instances may further include the following steps S610 to S630.

In step S610, the power-up test instances may be arranged into a test sequence.

In this step, the plurality of power-up test instances obtained from step S120 may be arranged to form a test sequence.

In step S620, power-up tests on the IC may be performed by successively using each of the power-up test instances in the test sequence.

According to the test sequence formed in step S610, in this step, power-up tests may be successively performed on the IC using each of the power-up test instances in the test sequence.

In step S630, if a test result using one of the power-up test instances in the test sequence is a failure, the power-up tests on the IC may continue by using a next one of the power-up test instances in the test sequence.

Subsequent to the completion of each test using a respective one of the power-up test instances, it will be determined whether the test is successful. If the test is determined to be successful, the process will proceed to a power-up test using the next power-up test instance in the test sequence. If the test is determined to be a failure, in this step, the process will similarly proceed to a power-up test using the next power-up test instance in the test sequence. After all the power-up test instances in the test sequence are used in the tests, the power-up test instances used in the failed tests may be collected for further analysis.

Figure 7:
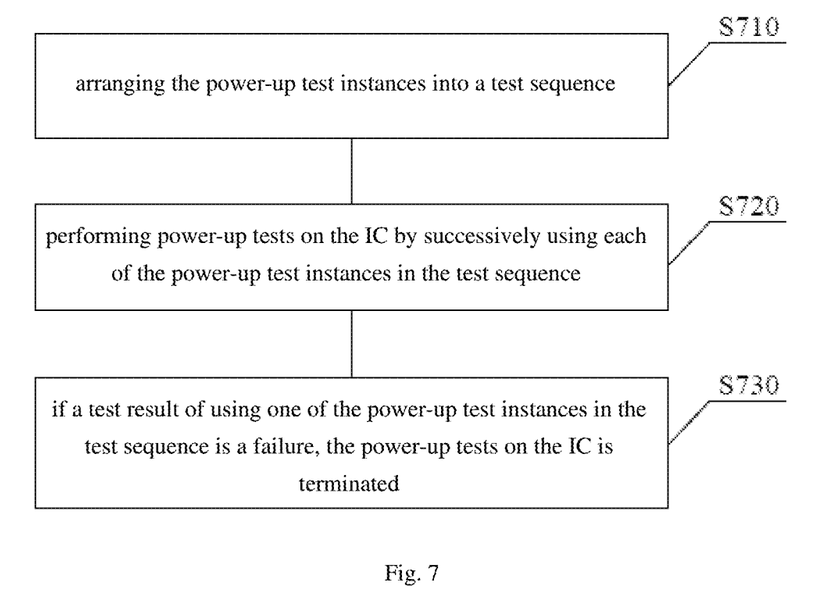
FIG. 7 shows a flowchart illustrating some steps of a power-up testing method in accordance with one embodiment of the present disclosure.

FIG. 7 shows a flowchart illustrating some steps of a power-up testing method in accordance with one embodiment of the present disclosure. Referring to FIG. 7, in some embodiments of the present disclosure, in step S130, performing power-up tests on the IC using the plurality of power-up test instances may include the following steps S710 to S730.

In step S710, the power-up test instances may be arranged into a test sequence.

In this step, the plurality of power-up test instances obtained from step S120 may be arranged to form a test sequence.

In step S720, power-up tests on the IC may be performed by successively using each of the power-up test instances in the test sequence.

According to the test sequence formed in step S710, in this step, power-up tests may be successively performed on the IC using each of the power-up test instances in the test sequence.

In step S730, if a test result of using one of the power-up test instances in the test sequence is a failure, the power-up tests on the IC is terminated.

Subsequent to the completion of each test using a respective one of the power-up test instances, it will be determined whether the test is successful. If the test is determined to be successful, the process will proceed to a power-up test using the next power-up test instance in the test sequence. If the test is determined to be a failure, in this step, the process will be terminated. That is, all the subsequent power-up tests to be performed using remaining ones of the power-up test instances are terminated. Subsequently, the power-up test instance used in the failed test may be analyzed, and the remaining power-up test instances in the test sequence may be screened based on the analysis. After that, only those remaining power-up test instances that have passed the screening may be used to perform the corresponding power-up tests.

Figure 8:
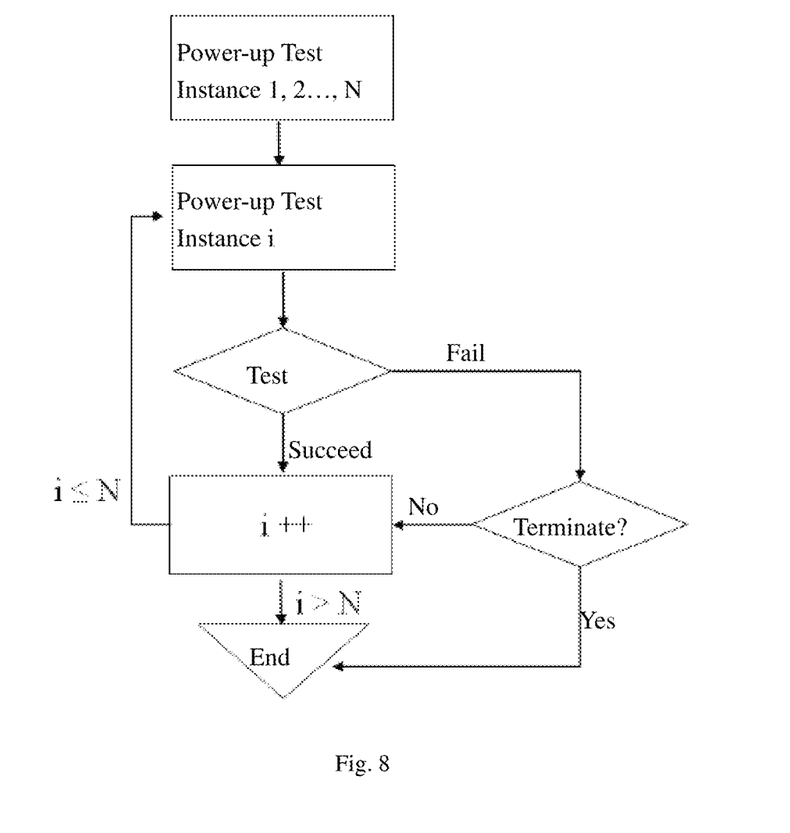
FIG. 8 shows a flowchart of a power-up testing method performed in a specific application scenario in accordance with one embodiment of the present disclosure.

FIG. 8 shows a flowchart of a power-up testing method performed in a specific application scenario in accordance with one embodiment of the present disclosure. In FIG. 8, the numerals 1 to N may denote power-up test instances corresponding to different power-up testing waveforms that have been arranged into a test sequence. By following the process shown in the flowchart, power-up tests may be performed based on the power-up test instances.

It is to be noted that while the steps in the methods according to exemplary embodiments of the present disclosure have been described above in particular orders, this is not intended to require or imply that the steps must be performed in the order presented, or that the desired benefits can only be achieved when all the steps are performed. Additionally or alternatively, one or more of the steps can be omitted, and/or some of them can be combined into a single step, and/or a certain step can be divided into multiple sub-steps.

Figure 9:
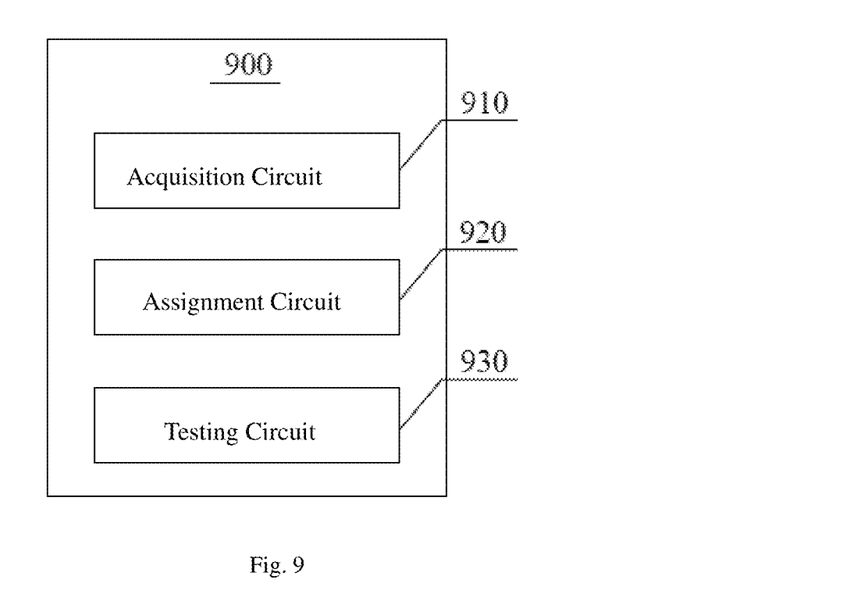
FIG. 9 shows a block diagram of an IC power-up testing device in accordance with one embodiment of the present disclosure.

The present disclosure further provides an IC power-up testing device. Referring to FIG. 9, the power-up testing device 900 may include an acquisition circuit 910, an assignment circuit 920 and a testing circuit 930. The acquisition circuit 910 may be configured to obtain power-up testing parameters for an IC, and a plurality of power-up testing waveforms. The assignment circuit 920 may be configured to generate a plurality of power-up test instances by conducting parameter assignments for the power-up testing waveforms based on the power-up testing parameters. The testing circuit 930 may be configured to perform power-up tests on the IC using the plurality of power-up test instances.

Since the details of the IC power-up testing device have been described accordingly in the above embodiments for the power-up testing method, a further description thereof is believed unnecessary and omitted here for the sake of conciseness.

It should be noted that although several circuits or units of the device for action execution have been discussed in the detailed description above, such division is not mandatory.

Indeed, in accordance with embodiments of the present disclosure, the features and functions of two or more circuits or units described above may be embodied in one circuit or unit. Conversely, the features and functions of one of the circuits or units described above may be further divided into multiple circuits or units.

The present disclosure further provides a computer readable memory medium storing a computer program. Upon being executed by a processor, the computer program may perform the power-up testing method described in any of the embodiments in the present disclosure. In some embodiments, various aspects of the present disclosure may also be implemented in the form of a program product including program code. The program product may be stored in a non-volatile memory medium (which may be a CD-ROM, a USB flash disk or a mobile hard disk or the like) or on a network. The program may be configured to, upon being run on a computing device (which may be a personal computer, a server, a terminal device, or a network device, etc.), cause the computing device to perform the method according to any of the aforementioned embodiments in the present disclosure.

Figure 10:
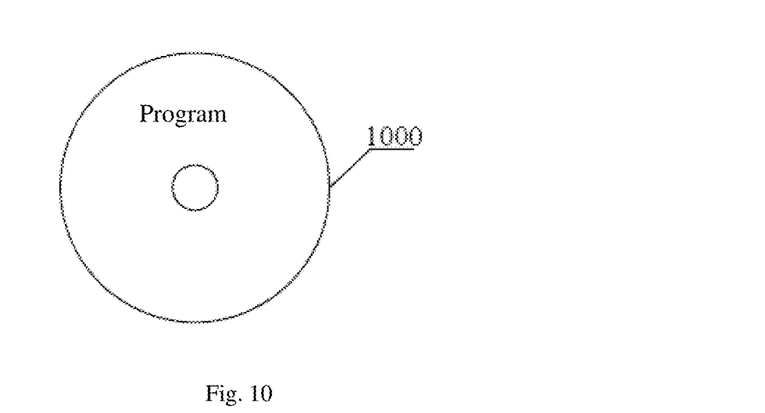
FIG. 10 shows a schematic diagram of a program product in accordance with one embodiment of the present disclosure.

FIG. 10 shows a schematic diagram of a program product in accordance with one embodiment of the present disclosure. Referring to FIG. 10, in some embodiments of the present disclosure, a program product 1000 for performing the above method may employ a portable compact disk read only memory (CD-ROM) and may include program code. The program product 1000 may operate in a computing device (e.g., a personal computer, a server, a terminal device, or a network device). The program product of the present disclosure, however, is not limited thereto. In some embodiments, the computer readable memory medium may be any tangible medium that can contain or store a program that can be used by one or combinations of an instruction execution system, apparatus, and device.

The program product may employ any combination of one or more readable media. The readable medium may be a readable signal medium or a readable memory medium.

The readable memory medium may be, for example, but not limited to, an electronic, magnetic, optical, electromagnetic, infrared, or semiconductor system, apparatus, or device, or any combination of the above. More specific examples (non-exhaustive lists) of readable memory media include: electrical connections by one or more wires, a portable disk, a hard disk, a random access memory (RAM), a read only memory (ROM), a wipeable programmable read only memory (EPROM or flash memory), an optical fiber, a portable compact disk read only memory (CD-ROM), an optical memory device, a magnetic memory device, or any suitable combination of the foregoing.

The readable signal medium may include a data signal that is transmitted in the baseband or as part of a carrier and may have readable program code. Such data signal transmitted may be in a variety of forms including, but not limited to, an electromagnetic signal, an optical signal, or any suitable combination of the foregoing. The readable signal medium may also be any readable medium other than a readable memory medium, and the readable medium can transmit, propagate, or transport a program for use by one or combinations of an instruction execution system, apparatus, and device.

Program code included in a readable medium can be transmitted by any suitable medium, including but not limited to wireless medium, wired medium, optical cable, RF, or any suitable combination of the foregoing.

Program code for performing the operations of the present disclosure may be written in any combination of one or more programming languages, including an object oriented programming language, such as Java, C++, etc., and conventional procedural programming language, such as the C language or a similar programming language. The program code can be executed entirely on the user computing device, partially on the user computing device, as a stand-alone software package, partially on the remote computing device and partially on the user computing device, or entirely on the remote computing device or on the server. In the case of a remote computing device, the remote computing device can be connected to the user computing device via any kind of network, including a local area network (LAN) or wide area network (WAN), or can be connected to an external computing device, for example, by internet provided by an internet service provider.

The present disclosure further provides an electronic equipment comprising at least one processor and at least one memory configured to store instructions executable by the at least one processor. The processor may be configured to, by executing the instructions, perform the method described in any of the embodiments of the present disclosure.

Figure 11:
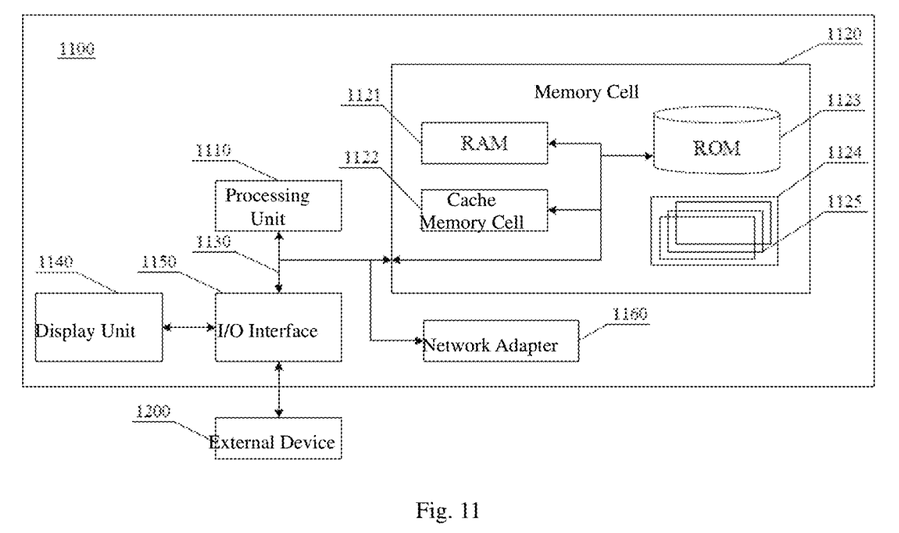
FIG. 11 shows a schematic diagram of an electronic equipment in accordance with one embodiment of the present disclosure.

FIG. 11 shows a schematic diagram of an electronic equipment in accordance with one embodiment of the present disclosure. The electronic equipment 1100 in the present exemplary embodiment will be described below with reference to FIG. 11. The electronic equipment 1100 is merely an example and should not impose any limitation on the function and scope of use of the embodiments of the present disclosure.

Referring to FIG. 11, the electronic equipment 1100 may be embodied in the form of a general-purpose computing device. Components of the electronic equipment 1100 may include, but not be limited to, at least one processing unit 1110, at least one memory cell 1120, a Bus 1130 that connects different system components (including the processing unit 1110 and the memory cell 1120), and a display unit 1140.

The memory cell 1120 may store program code, which may be executed by the processing unit 1110, such that the processing unit 1110 may perform the method described in any of the embodiments of the present disclosure.

The memory cell 1120 may include a readable medium in the form of a volatile memory cell, such as a random-access memory cell 1121 (RAM) and/or a cache memory cell 1122 and may further include a read only memory cell 1123 (ROM).

The memory cell 1120 may further include a program/utility 1124 having a set (at least one) of the program circuits 1125. The program circuits 1125 may include, but not be limited to: an operating system, one or more applications, other program circuits, and program data. A network environment may be implemented in one or combinations of the examples.

The Bus 1130 may represent one or more of several types of bus structures, including a memory cell bus or memory cell controller, a peripheral bus, a graphics acceleration port, a processing unit, or a local area bus using any of the bus structures. The electronic equipment 1100 may also be in communication with one or more external devices 1200 (e.g., a keyboard, a pointing device, a Bluetooth device, etc.), and may also be in communication with one or more devices that enable the user to interact with the electronic equipment 1100, and/or with any device (e.g., a router, a modem, etc.) that can be in communication with one or more other computing devices. The communication may be achieved by an input/output (I/O) interface 1150. Further, the electronic equipment 1100 may communicate with one or more networks (e.g., a local area network (LAN), a wide area network (WAN), and/or a public network, such as the Internet) through a network adapter 1160. As shown in FIG. 11, the network adapter 1160 may communicate with other circuits of electronic equipment 1100 via the Bus 1130. It should be understood that although not shown in the figures, other hardware and/or software circuits may be utilized in conjunction with electronic equipment 1100, including but not limited to: microcode, device drivers, redundant processing units, external disk drive arrays, RAID systems, tape drives and data backup memory systems, etc.

Those skilled in the art will appreciate that various aspects of the present disclosure can be implemented as a system, method, or program product. Accordingly, aspects of the present disclosure may be embodied in the form of a complete hardware, a complete software (including firmware, microcode, etc.), or a combination of hardware and software, which may be collectively referred to "circuit", "module", or "system" herein.

Other embodiments of the present disclosure will be apparent to those skilled in the art, after considering the specification and practicing the invention disclosed herein. The present application is intended to cover any variations, uses, or adaptations of the present disclosure, which are in accordance with the general principles of the disclosure and include common general knowledge or common technical means in the art that are not disclosed in the present disclosure. The specification and examples are to be regarded as illustrative only, the true scope and spirit of the disclosure is pointed out by the appended claims.

The features, structures, or characteristics described above may be combined in any suitable manner in one or more embodiments, and the features discussed in the various embodiments are interchangeable, if possible. In the description above, numerous specific details are set forth to provide a thorough understanding of the embodiments of the disclosure. However, one skilled in the art will appreciate that the technical solution of the present disclosure may be practiced without one or more of the specific details, or other methods, components, materials, and the like may be employed. In other instances, well-known structures, materials or operations are not shown or described in detail to avoid obscuring aspects of the present disclosure.

The invention claimed is:

1. A power-up testing method, applicable to an integrated circuit (IC), comprising:
    obtaining power-up testing parameters for the IC;
    obtaining a plurality of power-up testing waveforms by:
        obtaining a plurality of initial waveforms and a plurality of noise waveforms, and
        obtaining, by superimposing the plurality of initial waveforms with the plurality of noise waveforms, the plurality of power-up testing waveforms;
    generating, by conducting parameter assignments for the power-up testing waveforms based on the power-up testing parameters, a plurality of power-up test instances; and
    performing, using the plurality of power-up test instances, power-up tests on the IC.

2. The method of claim 1, wherein obtaining power-up testing parameters for the IC comprises:
    obtaining a target voltage and a power-up duration for the IC.

3. The method of claim 2, wherein obtaining power-up testing parameters for the IC further comprises:
    obtaining a number of voltage steps for the IC.

4. The method of claim 3, wherein obtaining a number of voltage steps for the IC comprises:
    obtaining a maximum number and a minimum number of voltage steps; and
    choosing a number between the maximum number and the minimum number as the number of voltage steps.

5. The method of claim 3, wherein generating, by conducting parameter assignments for the power-up testing waveforms based on the power-up testing parameters, a plurality of power-up test instances comprises:
    determining, based on the target voltage and the number of voltage steps, a step height of the voltage steps;
    determining, based on the power-up duration and the number of voltage steps, a step width of the voltage steps; and
    generating, by conducting parameter assignments for the power-up testing waveforms based on the step height and the step width, the plurality of power-up test instances.

6. The method of claim 1, wherein the plurality of initial waveforms and the plurality of noise waveforms are step voltage waveforms.

7. The method of claim 1, wherein each of the plurality of initial waveforms is an ascending step waveform, and each of the plurality of noise waveforms is a randomly-distributed step waveform.

8. The method of claim 1, wherein obtaining a plurality of initial waveforms and a plurality of noise waveforms comprises:
    choosing the plurality of initial waveforms and the plurality of noise waveforms from a predefined test waveform library.

9. The method of claim 1, wherein performing, using the plurality of power-up test instances, power-up tests on the IC comprises:
    arranging the power-up test instances into a test sequence; and
    performing power-up tests on the IC by successively using each of the power-up test instances in the test sequence,
    wherein, if a test result of using one of the power-up test instances in the test sequence is a failure, the power-up tests on the IC continue by using a next one of the power-up test instances in the test sequence.

10. The method of claim 1, wherein performing, using the plurality of power-up test instances, power-up tests on the IC comprises:
    arranging the power-up test instances into a test sequence; and
    performing power-up tests on the IC by successively using each of the power-up test instances in the test sequence,
    wherein, if a test result of using one of the power-up test instances in the test sequence is a failure, the power-up tests on the IC is terminated.

11. An electronic equipment, comprising:
    a processor; and
    a memory, configured to store instructions executable by the processor,
    wherein the processor is configured to, by executing the instructions, perform a power-up testing method applicable to an integrated circuit (IC), comprising:

obtaining power-up testing parameters for the IC;
obtaining a plurality of power-up testing waveforms, wherein to obtain the plurality of power-up waveforms, the processor is further configured to perform operations, comprising:
  obtaining a plurality of initial waveforms and a plurality of noise waveforms, and
  obtaining, by superimposing the plurality of initial waveforms with the plurality of noise waveforms, the plurality of power-up testing waveforms;
generating, by conducting parameter assignments for the power-up testing waveforms based on the power-up testing parameters, a plurality of power-up test instances; and
performing, using the plurality of power-up test instances, power-up tests on the IC.

12. The equipment of claim 11, wherein, when obtaining power-up testing parameters for the IC, the processor is further configured to:
obtain a target voltage and a power-up duration for the IC.

13. The equipment of claim 12, wherein, when obtaining power-up testing parameters for the IC, the processor is further configured to:
obtain a number of voltage steps for the IC.

14. The equipment of claim 13, wherein, to obtain a number of voltage steps for the IC, the process is further configured to:

obtain a maximum number and a minimum number of voltage steps; and
choose a number between the maximum number and the minimum number as the number of voltage steps.

15. The equipment of claim 13, wherein, when generating a plurality of power-up test instances, the processor is further configured to:
determine, based on the target voltage and the number of voltage steps, a step height of the voltage steps;
determine, based on the power-up duration and the number of voltage steps, a step width of the voltage steps; and
generate, by conducting parameter assignments for the power-up testing waveforms based on the step height and the step width, the plurality of power-up test instances.

16. The equipment of claim 11, wherein the plurality of initial waveforms and the plurality of noise waveforms are step voltage waveforms.

17. The equipment of claim 11, wherein each of the plurality of initial waveforms is an ascending step waveform, and each of the plurality of noise waveforms is a randomly-distributed step waveform.

* * * * *